UNITED STATES PATENT OFFICE.

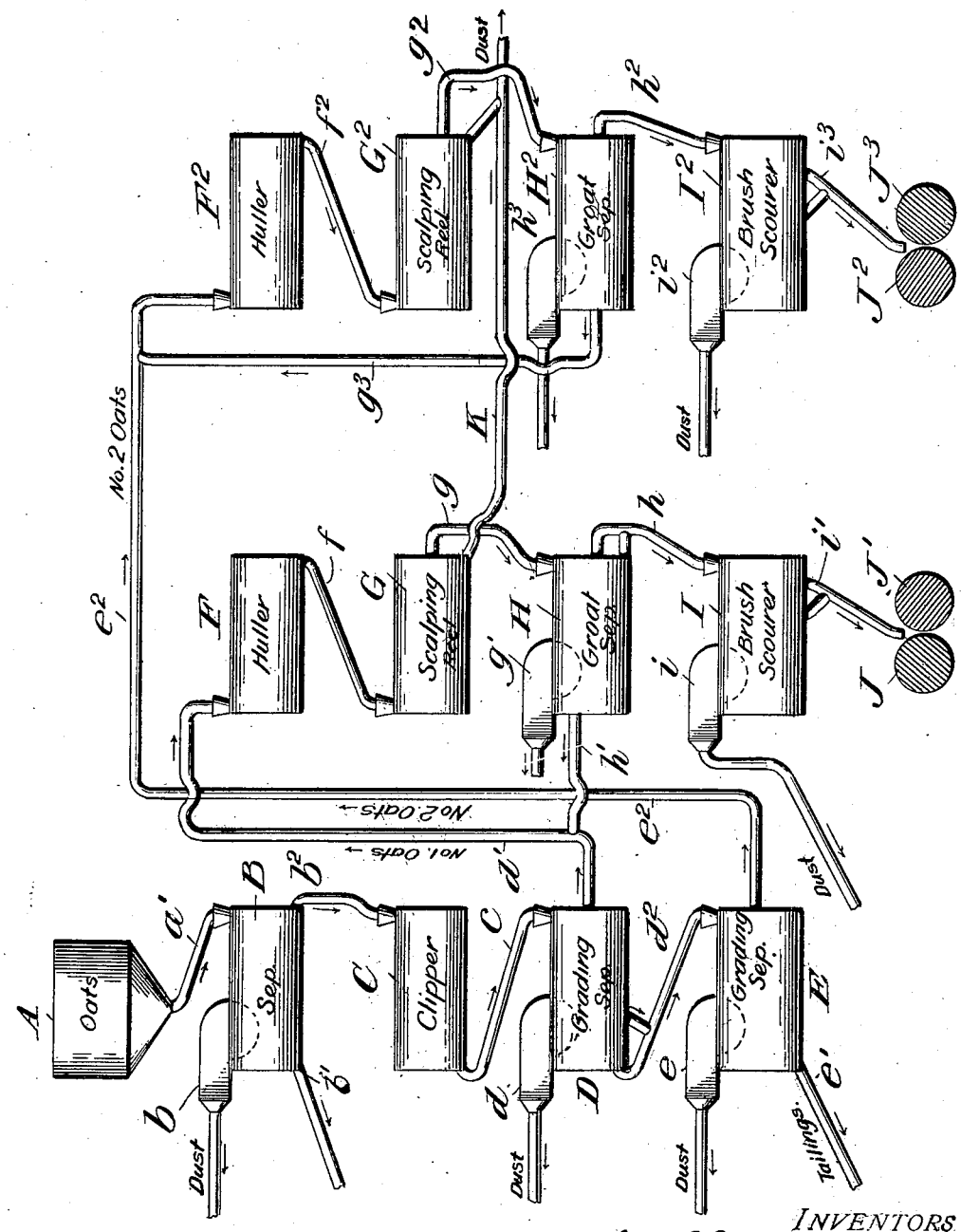

JOHN D. NAGEL AND HENRY R. NAGEL, OF BUSHNELL, ILLINOIS.

ROLLED-OATS PROCESS.

SPECIFICATION forming part of Letters Patent No. 677,789, dated July 2, 1901.

Application filed September 13, 1900. Serial No. 29,936. (No specimens.)

*To all whom it may concern:*

Be it known that we, JOHN D. NAGEL and HENRY R. NAGEL, of Bushnell, McDonough county, Illinois, have invented certain new and useful Improvements in Rolled-Oats Processes; and we hereby declare that the following is a full, clear, and exact description thereof, reference being had to the accompanying drawing, which forms part of this specification.

This invention is an improved process of treating oats for food; and the object of the invention is to produce "rolled oats" or "oat-flakes" in which the natural flavor of the oat-grains and all the nutriment thereof will be preserved and retained.

Heretofore in making rolled oats the grain has been heated or kiln-dried to enable the hulls to be detached from the kernels, and in some instances the grain has been steamed before rolling. These steps are most detrimental and largely reduce the nutritive value of the product as a food, because the heating destroys or extracts much of the nutrition from the grain, kills its life, and destroys the natural flavor of the grain. The heat also depreciates the keeping qualities of the product and produces favorable conditions therein for the breeding of worms and insects. In our process the objectionable step of heating or steaming the grain is entirely avoided. The hulls are detached from the kernels in a natural condition and the kernels separated and purified from all fiber and foreign substances, and ultimately compressed into thin flakes which retain all the natural flavor and nutriment of the grain and are more readily digested than the old partly-cooked products, and, further, our product may be kept much longer than the ordinary rolled oats without becoming musty or breeding worms or weevil, and the flakes are much larger than those hitherto produced by the old processes.

The product of our process is superior to anything heretofore produced, and we attribute its superiority to the fact that we entirely avoid the disadvantageous and deleterious effect produced on the grain by steaming or heating the same, as has been heretofore customary, and, further, by the fact that in our process the oats are taken in their natural state, thoroughly cleaned, clipped, and graded uniformly, then hulled, then the hulls are removed from the groats, after which the groats are polished, and finally the thoroughly-purified kernels are flaked by passing them between suitable rolls. Care is taken during our entire process to avoid any heating of the grain and to keep it always in its natural cool condition, so that the product will retain all the natural flavor and nutriment of the grain and be entirely free from any particles of dust, hulls, or grit.

Our invention therefore consists in the novel process of treating the oats to produce the improved product, as hereinafter described and claimed, and the accompanying drawing illustrates diagrammatically an apparatus employed in carrying out our process.

Referring to the drawing, A represents a bin containing marketable oats in their natural condition. These oats are conducted from the bin through a spout $a'$ into a separator B, which is constructed to separate the sound grains from light grains and impurities and foreign substances, which are conducted off through the spout $b'$, while the dust and light impurities may be aspirated through the spout $b$. The clean grain is conducted from the separator B through spout $b^2$ to the clipper C, which is constructed to clip or scour off the long beards of the grain and make them smooth and polished, so that they can be thereafter readily separated on sieve-machines, and this clipper C is also constructed to separate any double oat-kernels, which is necessary to the perfect carrying out of the process. These double kernels usually consist of a small and a large kernel grown in one hull or coating, and it is necessary that these be divided before sending same to the huller. These small kernels are principally responsible for the hulls and chaff which are so generally found in the common hulled oats upon the market. From the clipper C the polished grains, with the clippings and scourings, pass through the pipe $c$ into the grading-separator D, which is constructed to thoroughly grade the oats, preferably by means of sheet-metal sieves having perforations which will allow all except the desired and best oats to pass through. The beards, hulls, and other light impurities may be aspirated from the grading-separator D through the pipe $d$, while the small grains pass on through a pipe $d^2$ into a second grading-separator E, which is constructed like separator D except that the perforations in its sieves are made slightly smaller, so that they will separate the smaller or second grade of oats from the tailings or screenings. The dust and like impurities may be aspirated from separator E through pipe $e$, while the heavy impurities and refuse can be discharged through the pipe $e'$.

The oats separated in separator D may be called "No. 1" oats, which are larger than the oats separated in separator E, which latter may be called "No. 2" oats, and we preferably treat these two grades alike, but separately.

As shown, the No. 1 oats are conducted from the separator D by pipe $d'$ to a huller F, preferably a centrifugal machine, by which the hulls are loosened from the kernels. The groats, hulls, and kernels are discharged from huller F through pipe $f$ into the bolting or scalping reel G, which is preferably clothed with wire-cloth of suitable mesh, to extract the fine dust and particles from the groats, and this dust is drawn off through the pipe K, while the groats and hulls are discharged through a pipe $g$ into a separator H, which is of such construction that it will first separate the hulls from the groats, preferably by aspiration, through spout $g'$ in any suitable manner, and then separate the hulled kernels from the unhulled ones. It is enabled to do this by means of suitable screens whose perforations will only permit the passage of the hulled oats and because the oats were graded to a uniformed size before they passed to the huller and the groats (or hulled oats) are much shorter than the unhulled kernels or oats. The unhulled oats are returned from the separator H to the huller F by means of the pipes $h'$ and $d'$, while the separated No. 1 kernels are discharged through pipe $h$ into a scourer I, which thoroughly polishes the kernels and removes all dust, hair, fiber, &c., which might possibly adhere thereto, this dust, &c., being aspirated from the scourer through the pipe $i$. The now thoroughly-cleaned and uniformly-sized kernels are conducted from the scourer I through pipe $i'$ between the rolls J J', by which they are flattened into flakes or wafers. This completes the process, and the product delivered from the rolls J J' is ready for the market.

It will be observed that the grain is treated throughout in its natural condition, is not subjected to any steaming or heating, is thoroughly cleansed of all impurities, the kernels are thoroughly separated from the hulls and are graded to uniform size before flaking, and the product contains all the nutriment and flavor of the natural grain, while being entirely free from husks or other impurities.

The No. 2 oats are treated exactly in the same manner as the No. 1 oats, but are carried from separator E through pipe $e^2$ to a huller $F^2$, thence through pipe $f^2$ to scalping-reel $G^2$, thence through the pipe $g^2$ to groats-separator $H^2$, thence through pipe $h^2$ to brush scourer $I^2$, and thence through pipe $i^3$ to flaking-rolls $J^2$ and $J^3$. The dust-outlet from the scalper $G^2$ is connected to a pipe K. The hulls from separator $H^2$ are aspirated off through pipe $h^3$, and the dust from scourer $I^2$ is aspirated through pipe $i^2$. Any unhulled oats passing into separator $H^2$ are returned through pipes $g^3$ and $e^2$ to huller $F^2$. The process and apparatus for treating the No. 2 oats, it will be observed, are exactly similar to those of treating the No. 1 oats, only the adjustment of the huller $F^2$ would be slightly closer and the screen of the separator $H^2$ slightly finer for the No. 2 oats than for the No. 1 oats because of the difference in the size of the kernels to be treated.

Having thus described our invention, what we therefore claim as new, and desire to secure by Letters Patent thereon, is—

1. As an improved article of manufacture the herein-described product from oats in their natural condition consisting of the uncooked and unheated, hulled, natural oat-kernels pressed into flakes.

2. As an improved article of manufacture the herein-described product from oats consisting of the uncooked and unheated, hulled kernels of oats in their natural condition graded to uniform size, cleaned and pressed into flakes.

3. The herein-described process of manufacturing rolled oats, consisting in cleaning and clipping the oats and subsequently separating the oats from the chaff caused by the clipping of the grain, grading the clipped oats to obtain uniform length thereof, hulling such graded oats, cleaning and separating the kernels from the hulls, and finally flaking the kernels for the purpose and substantially as described.

4. The herein-described process of treating oats in a natural uncooked and unheated condition consisting in cleaning, clipping and separating the oats, grading them according to size to obtain uniform lengths of kernels, then separately treating each grade of oats in a hulling-machine to detach the hulls from the kernels, then cleaning and separating the hulls from the kernels and separating any unhulled kernels from the hulled ones, cleaning the separated kernels, and finally flaking them, for the purpose and substantially as described.

In testimony that we claim the foregoing as our own we affix our signatures in presence of two witnesses.

JOHN D. NAGEL.
H. R. NAGEL.

In presence of—
 JOHN N. ZOOK,
 CHARLES W. HAGAMAN.